(12) United States Patent
Kogan et al.

(10) Patent No.: US 6,504,611 B2
(45) Date of Patent: Jan. 7, 2003

(54) TWO STAGE OPTICAL ALIGNMENT DEVICE AND METHOD OF ALIGNING OPTICAL COMPONENTS

(75) Inventors: Yakov Kogan, Bedford, MA (US); Parviz Tayebati, Boston, MA (US); Daryoosh Vakhshoori, Cambridge, MA (US)

(73) Assignee: CoreTek, Inc., Wilmington, DE (US)

( * ) Notice: Subject to any disclaimer, the term of this patent is extended or adjusted under 35 U.S.C. 154(b) by 26 days.

(21) Appl. No.: 09/859,778

(22) Filed: May 17, 2001

(65) Prior Publication Data

US 2002/0008875 A1 Jan. 24, 2002

Related U.S. Application Data

(60) Provisional application No. 60/204,964, filed on May 17, 2000.

(51) Int. Cl.[7] .............................................. G01B 11/00
(52) U.S. Cl. ...................................... 356/399; 356/400
(58) Field of Search ................................. 356/399, 400, 356/614, 615

(56) References Cited

U.S. PATENT DOCUMENTS

| 5,907,405 A | * | 5/1999 | Mizutani et al. ............. 356/399 |
| 5,916,458 A | * | 6/1999 | Komoriya et al. ...... 219/121.63 |
| 6,163,369 A | * | 12/2000 | Yamada et al. ................ 355/55 |
| 6,181,474 B1 | * | 1/2001 | Ouderkirk et al. .......... 359/629 |
| 6,191,858 B1 | * | 2/2001 | Miyatake .................... 356/399 |

* cited by examiner

Primary Examiner—Karl D. Frech
Assistant Examiner—Ahshik Kim
(74) Attorney, Agent, or Firm—Pandiscio & Pandiscio

(57) ABSTRACT

A method and an automated apparatus for three-dimensional optical alignment of optical components for testing or assembly purposes comprise use of a visible light vision system to assist active alignment of optical components based on the measured optical output at a wavelength of light outside of the visible range.

21 Claims, 1 Drawing Sheet

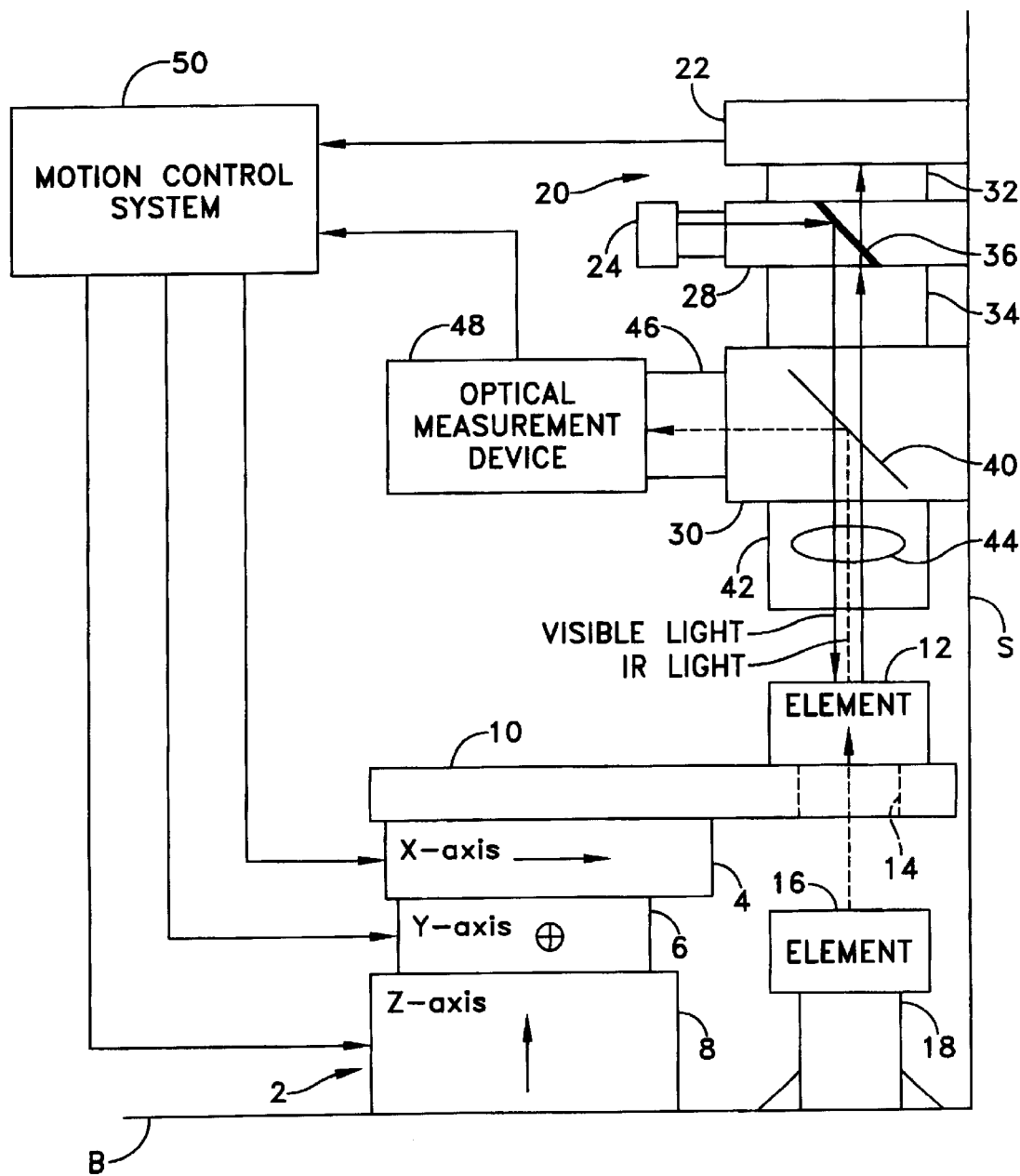

TWO STAGE OPTICAL ALIGNMENT DEVICE AND METHOD OF ALIGNING OPTICAL COMPONENTS

This application claims priority benefits under 35 United States Code, Section 119(e) of co-pending U.S. Provisional Application No. 60/204,964, filed May 17, 2000, for Two Stage Optical Alignment Device.

FIELD OF INVENTION

This invention relates to alignment of optical components for testing and assembly of optical systems operating outside of the visible light range, and more particularly to the alignment of optical components for infra-red optical systems.

BACKGROUND OF THE INVENTION

In the manufacture of optical systems, and more particularly fiber optic communications systems, it is essential to provide efficient optical coupling of optical components for testing, and optionally for assembly, purposes. By way of example, manufacture of certain optoelectronic devices for fiberoptic communications systems may require alignment along orthogonal X-Y-Z axes of a first optical element that has an aperture in the form of an opening or a window that is transparent with respect to light with a wavelength outside of the visible light range, e.g., a Fabry-Perot optical filter or a vertical cavity semiconductor laser, with a light beam emanating from a second optical element, e.g., a laser light source or an optical fiber serving as a light input source. More specifically, the two optical elements must be aligned in an X-Y plane and also precisely spaced along a Z axis that is normal to that plane. It is essential that the alignment process be precise, reliable, repeatable and fast.

OBJECTS AND SUMMARY OF THE INVENTION

The primary object of this invention is to provide an automated apparatus and method for precise three-dimensional optical alignment of optical components during assembly and inspection.

A more specific object is to provide an automated apparatus and method for three-dimensional optical alignment that employs a two-dimensional visible light machine vision system to assist active alignment of optical components based on the measured optical output at a wavelength of light outside of the visible range.

A further object is to provide an apparatus and method for aligning optical elements, one of which is a source of an optical beam with a wavelength outside of the visible range, with a 5 micron precision along the axis of the beam (Z axis) and a 0.25 micron precision in a plane perpendicular to the axis of the beam (the X-Y plane).

These objects are achieved by providing a motorized X-Y-Z motion apparatus having a movable support member for supporting a first optical element having an aperture for transmittal of light with a wave-length outside of the visible light spectrum and motion-translating means for selectively moving that support member along mutually orthogonal X, Y and Z axes, means for supporting a second optical element in the form of a source of a light beam having a wavelength outside of the visible range in a fixed position relative to the motorized motion apparatus with that light beam directed in the Z-axis direction at the aperture of the first optical element, a visible light vision system using visible light imaging for determining (a) the position of the first optical element relative to said visible light vision system in the X-Y plane and (b) the sharpness of the image of the first element as detected by the visible light vision system, an optical measurement device responsive to the beam for measuring a power-related value of the beam, and a motion control system for causing the motion-translating means to (a) move the movable support member in the X-axis, Y-axis and Z-axis directions as required to achieve X-axis and Y-axis alignment of said first optical element with said visible light vision system and maximize the sharpness of the image, and (b) subsequently move said movable support member first in the Z-axis direction and then in the X-axis and Y-axis directions as required to maximize a power-related value of said beam as measured by said optical measurement device. Other features and advantages of the invention are set forth in or rendered obvious by the following detailed description of the invention which is to be considered together with the accompanying drawing.

THE DRAWING

The drawing schematically illustrates a system embodying the invention.

DETAILED DESCRIPTION OF THE INVENTION

The system shown in the drawing comprises a motorized X-Y-Z motion apparatus 2 that comprises three stages 4, 6 and 8, which are coupled together and carry a platform 10. Stage 4 is movable bidirectionally in the X-axis direction; stage 6 is movable bidirectionally in the Y axis direction at a right angle to the X axis, and the third stage 8 is movable bidirectionally vertically along the Z axis orthogonal to the X and Y axes. The platform 10 serves as a support for a first optical element 12 which is to be aligned. The platform 10 has an opening 14 to permit light to be transmitted to the optical element 12 from a second optical element 16 that is mounted on a support 18 that is fixed in relation to the motion apparatus 2 and also a visible light vision system 20. Although not shown, it is to be understood that means are provided for securing optical elements 12 and 16 against movement relative to platform 10 and support 18 respectively. The fixed relationship between motion apparatus 2, support 18 and vision system 20 is represented schematically in the drawing by the intersecting lines B and S.

The visible light vision system 20 comprises an electronic camera 22, preferably a digital camera, that employs a CCD, MOS or another suitable semiconductor imaging device (not shown). A light source 24 is coupled so as to supply visible light to a housing 28 which is mechanically and optically connected to camera 22 and a second housing 30, e.g., by barrel members 32 and 34. Housing 28 contains an optical system comprising a 50/50 beam splitter schematically represented at 36 which (a) directs the visible light from source 24 so as to illuminate optical element 12 and (b) transmits the visible light reflected by element 12 to camera 22, whereby a visible image of that optical element may be received by the imaging device of camera 22. In the drawing the visible light path is represented by the solid line arrows. For convenience of illustration, the portion of the visible light path running from beam splitter 36 to optical element 12 is offset from that portion of the light path that extends from optical element 12 to the camera.

Housing 30 contains a dichroic mirror 40 that is disposed at a 45° angle to the optical axis of camera 22. Mounted in an extension 42 of housing 30 is an objective lens represented schematically at 44. Housing 30 has a side opening and connected to that side opening is a tubular barrel 46 which in turn is coupled to an optical measurement device represented schematically at 48. The optical measuring device may take various forms; preferably it is an optical power meter or an optical spectrum analyzer. In the case where the optical elements are to be aligned for infra-red light testing and assembly, the optical measurement device essentially comprises an IR detector.

Although not shown, it is to be understood that optical element 12 has an internal aperture in the form of an opening or a window that is transparent to light having a wavelength outside of the visible light range, with the element 12 being, for example, a Fabry-Perot optical filter or a vertical cavity semiconductor laser. The element 16, which may be a semiconductor laser or an input optical fiber serving as a source of optical power outside of the visible range, is mounted on the support 18 so as to be substantially centered with respect to the optical axis of the visible light vision system, so as to direct a beam of light outside of the visible range through opening 14 and the aperture of optical element 12. The dichroic mirror 40 is adapted to pass visible light from the visible light vision system through the objective 44 to effect imaging of optical element 12, and to reflect the non-visible light beam from source 16 to the optical measuring device 48. The path followed by the non-visible light beam from source 16 is indicated by the broken line arrow.

The visible light vision system is adapted to determine the X-Y position of optical element 12 in relation to the vision system by measuring the degree of X-Y plane registration of the image of said optical element with the camera's imaging device, and also is adapted to produce a first output error signal representative of the extent of X-axis and Y-axis misalignment of said first optical element in relation to that imaging device. The vision system is also adapted to determine the sharpness of the image seen by the camera by measuring the intensity gradient of the image, e.g., the contrast, at the periphery of the image, and to produce a second signal that varies as a function of image sharpness. Those signals are applied sequentially to a programmable motion control system 50. The first signal causes the motor control system to activate the X axis and Y axis stages 4 and 6 so as to move platform 10 in the X-axles and Y-axis directions to the extent required to place the element 12 in alignment with the vision system in the X-Y plane. The second signal produced by the vision system causes control system 50 to effect operation of the Z-axis stage 8 whereby to shift the position of optical element 12 along the Z axis, i.e., along the optical axis of the visible light vision system, until the vision system has determined that the image received by the camera has achieve maximum sharpness. In effect, the vision system and the motion control system coact to provide automatic focusing, with the Z axis stage moving until the maximum intensity gradient is observed at the edges of the image seen by the camera.

When a light beam with a wavelength outside of the visible range is transmitted by optical element 16 though optical element 12, it passes through and is transmitted by objective 44 onto mirror 40, which reflects it to optical measurement device 48. The optical measurement device 48 is adapted to measure a selected power-related value of the light beam reflected by dichroic mirror 40. For example, it may be adapted to measure the overall intensity of the beam, or the intensity of a selected mode or the intensity differential between two modes. The optical measurement device produces a feedback control signal which is applied to the motion control system. The latter responds to that signal by causing stages 4 and 6 to effect X-Y plane movement of platform 10 and thereby optical element 12 in a direction to maximize the measured power-related value of the light beam from optical element 16. That value is at its maximum only when the aperture of optical element 12 has been aligned with the non-visible light beam from optical element 16.

In the preferred embodiment of this invention, the motion control system is programmed so as to automatically cause the motorized Z-axis stage 8 to move the optical element 12 a predetermined amount along the Z axis after the three-axis visible light alignment has been accomplished and before it causes the X and Y stages 4 and 6 to move to maximize the power-related value of the non-visible light beam measured by optical measurement device. This automatic Z-axis movement, which is identified herein as "offset", is for the purpose of (a) compensating for mechanical misalignment of motion apparatus 2, vision system 20 and the fixed position of optical element 16 as determined by support 18, and (b) correcting for optical aberration resulting from the fact that non-visible and visible light behave differently in passing through the objective. The amount of offset is determined by prior measurements.

In the preferred embodiment of the invention, the motion control system 50 is programmed to achieve alignment by automatically executing a method comprising the following steps:

1. Vision system 20 measures the position of optical element 12 in the X-Y plane and if the image is not in registration with predetermined X-Y coordinates of the imaging device of camera 22, the vision system of the camera delivers a control signal to the motion control system which in turn causes movement of X stage 4 and/or Y stage 6 so as to move element 12 into alignment with the visible light vision system.

2. Next, the visible light vision system measures the sharpness of the image of optical element 12 and delivers a signal to the motion control system which causes it to operate the Z axis stage of the motion apparatus so as to shift optical element 12 incrementally along the Z axis until the image focused on the image plane of camera 22 has achieved maximum sharpness.

3. Next, motion control system 50 automatically activates the Z axis stage so as to cause the optical element 12 to shift a predetermined amount in a predetermined direction for the purpose of compensating for mechanical misalignments and correcting for chromatic aberration.

4. Thereafter the optical element 16 is caused to transmit a non-visible light beam through optical element 12 to mirror 40, and optical measurement device 48 measures the intensity of that beam as reflected by mirror 40 and generates control signals which are applied to the motion control system 50 so as to cause the X-axis stage 4 and/or the Y-axis stage 6 to move in a direction and by an amount sufficient to maximize the power related value measured by the optical measurement device 48. As noted above, the optical measurement device 48 may measure various power related values of the non-visible light beam, but preferably it is programmed to measure the maximum optical power of the reflected light beam and/or the maximum side mode suppression of that light.

Thereafter the optical element 12 may be fixed in an optical assembly or subjected to other optical measurements.

It is to be noted that the invention need not be practiced exactly as hereinabove described and illustrated. For one thing, the invention may be modified by providing more than two optical elements in the system to be aligned. Additionally or alternatively, there may be more than one three-dimensional moving mechanism 2 to move more than one optical component of the system under alignment. Furthermore, it is contemplated that the three-dimensional mechanism 2 can be arranged differently than as illustrated and described. For example, the three-dimensional motion apparatus or device can be arranged so that one axis of motion can move one optical element of the optical system under alignment, together with the vision system and the optical measurement device, and a dual axis motion system can be used to move the second optical element. Further with respect to the invention, it should be noted that the visible light vision system and the optical measurement device may move relative to one another so long as their mutual position is known with sufficient accuracy. Also the invention may be adapted for use with a non-infra-red light source as the optical element 16. The present invention can also be used if more precise Z-axis alignment is required. In that case, an another step is added to the sequence of steps described hereinabove. During this step the Z-axis position of optical element 12 will be further optimized to obtain a maximum for the optical power-related value measured by optical measurement device 48.

In addition to the advantages rendered obvious by the foregoing description, it should be noted that the two-stage alignment process of the present invention makes it possible to obtain precise alignment even though the optical element represented at 12 may not have a precise peripheral configuration or a peripheral configuration that is exactly concentric with its aperture, since the active non-visible light X-Y alignment steps assure that the non-visible light beam is accurately centered with respect to that aperture. Moreover use of a vision system for three-dimensional alignment as herein described allows for faster alignment. The invention also makes possible a reduction in the cost of alignment equipment by reducing the stroke and velocity requirements needed from the super precision-actuators used for fine active alignment. The invention also reduces the cost and complexity of the alignment equipment by promoting the use of conventional two-dimensional machine vision systems for three-dimensional alignment. It also promotes the use of a visible light machine vision system to perform alignment of optical systems with a wavelength of light outside a visible light. A further advantage is that a visible light vision system as described is well known to persons skilled in the art, as are motion control systems and three-axis motion systems. Another advantage is that motion apparatus of the kind contemplated by the invention is commercially available. Moreover, the individual X, Y and Z axis stages are available for separate mounting. Thus, for example, stages 4, 6 and 8 may be like the linear motor driven stages sold by Anorad Corporation of Hauppauge, New York and Aerotech Corporation of Pittsburgh, Pa.

What is claimed is:

1. An apparatus for achieving three-dimensional optical alignment of first and second optical elements for assembly in optical systems operating outside of the visible light range, said apparatus comprising:

a motorized X-Y-Z motion apparatus having a movable support member for supporting a first optical element and motion-translating means for selectively moving that support member along any of mutually orthogonal X, Y and Z axes;

support means for supporting a second optical element in the form of a source of a light beam having a wavelength outside of the visible range in a fixed position relative to the motorized motion apparatus so that the axis of said beam is directed along the Z-axis perpendicular to said X and Y axes;

a motion control system coupled to said motion apparatus for controlling operation of said motion translating means;

a visible light vision system having an optical axis that extends parallel to said Z axis and means including electronic imaging means for (a) determining the position in the X-Y plane of said first optical element supported by said movable support member and for generating a first control signal representative of the misalignment in the X-Y plane of said first optical member in relation to said second optical member supported by said support means and (b) determining the sharpness of the image of said first optical element seen by said imaging means and for generating a second control signal representative of the sharpness of said image;

means for applying said first and second control signals to said motion control system, said motion control system being operative in response to said first control signal to cause said motion translating means to bring said first optical element into alignment in the X-Y plane with said second optical element and being operative in response to said second control signal to cause said motion translating means to move said first optical element in a selected Z-axis direction so as to maximize the sharpness of said image;

an optical measurement device for measuring a power-related value of a light beam having a wavelength outside of the visible range produced by said second optical element and for generating a third control signal that varies as a function of the measured power-related value of said beam; and means for applying said third control signal to said motion control system, said motion control system being operative in response to said third control signal to cause said motion control system to operate said motion translating means so as to move said first optical element in the X-Y plane in a direction and by an amount that results in maximizing said power-related value of said light beam.

2. An apparatus according to claim 1 wherein said motion control system is programmed to cause said motion translating system to move said first optical element a predetermined distance in a predetermined Z-axis direction before said third control signal is generated by said optical measurement device and applied to said motion control system.

3. An apparatus according to claim 2 wherein said motion control system is programmed to cause said motion translating system to move said first optical element after said first and second control signals are applied to said motion control system.

4. An apparatus according to claim 2 wherein said predetermined distance is for the purpose of correcting for chromatic aberration and mechanical misalignment of said motion apparatus, visible light vision system and said optical measurement device.

5. An apparatus according to claim 1 further including a first optical element in the form of a Fabry-Perot optical filter or a vertical cavity semiconductor laser mounted on said movable support member, and a second optical element supported by said support means in X-Y plane alignment with said visible light vision system, said second optical element comprising means for providing a beam of light having a wavelength outside of the visible range with said beam being directed in the Z-axis direction.

6. An apparatus according to claim 1 wherein said visible light vision system comprises an electronic camera, an objective, a dichroic mirror positioned between said objective and said camera at an angle to the optical axis to said vision system, said mirror being transparent to said visible light and functioning as reflector of light with a wavelength outside of the range of visible light, a source of visible light, and means for directing said visible light through said mirror and objective along said optical axis to illuminate a first optical element mounted on said movable support member, whereby to produce an image of said first optical element that is captured by said camera.

7. An apparatus according to claim 6 wherein the position of said visible light vision system in the X-axis and Y-axis directions is fixed relative to the position of said support means for said second optical element.

8. An apparatus according to claim 6 wherein said mirror is designed to pass visible light but reflect IR light.

9. An apparatus for achieving three-dimensional optical alignment of first and second optical elements for assembly in optical systems operating outside of the visible light range, with said first optical element having an aperture and said second optical element being a source of a light beam having a wavelength outside of the visible light range, said apparatus comprising:

a motorized X-Y-Z motion apparatus having a movable support member for supporting said first optical element so that its said aperture defines a passageway for light in the Z-axis direction, and motion-translating means for selectively moving that support member along any of mutually orthogonal X, Y and Z axes;

support means for supporting said second optical element in a fixed position relative to the motorized motion apparatus so that the axis of said beam is directed along the Z-axis perpendicular to said X and Y axes;

a motion control system coupled to said motion apparatus for controlling operation of said motion translating means;

a visible light vision system having an optical axis that extends in the Z-axis direction and is fixed in the X-axis and Y-axis directions relative to said support means for said second optical element, said vision system comprising means for capturing an image of said first optical element in the X-Y plane and generating signals representative of the misalignment of said image relative to said vision system in the X-Y plane and the sharpness of said image, and means for applying said signals to said motion control system so as to cause said motion control system to operate said motion translating means so as to sequentially (a) move said first optical element in the X-axis and/or Y-axis directions so as to bring said image of said first optical element into X-Y alignment with said vision system and (b) move said first optical element in the Z-axis direction so as to maximize the sharpness of said image;

an optical measurement device responsive to said beam for measuring a power-related value of said beam and for generating additional signals that vary as a function of the measured value of said beam, and means for applying said additional signals to said motion control system, said motion control system being operative in response to said additional signals so as to cause said motion translating means to move said first optical element in the X-axis and/or Y-axis directions to an extent that maximizes said measured value of said beam.

10. An apparatus according to claim 9 wherein said motion control system is programmed to respond in sequence first to said signals produced by said vision system and thereafter to said additional signals produced by said optical measurement system.

11. An apparatus according to claim 10 wherein said motion control system is programmed to cause said motion translating system to move said first optical element a predetermined distance in the Z-axis direction before it responds to said additional signals.

12. An apparatus according to claim 11 wherein the movement of said first optical element said predetermined distance is for the purpose of correcting for optical aberration.

13. An apparatus according to claim 11 wherein said visible light vision system comprises an electronic camera having a semiconductor imaging device, an objective, and a dichroic mirror positioned between said objective and said camera at an angle to the optical axis to said vision system, said mirror being transparent to said visible light and functioning as reflector of light with a wavelength outside of the range of visible light, and further wherein said first signal represents the degree of X-axis and Y-axis misalignment of said first optical in relation to a selected area of said semiconductor imaging device.

14. An apparatus according to claim 11 wherein said optical measurement device comprises an IR detector.

15. An apparatus for achieving three-dimensional optical alignment of first and second optical elements for assembly in optical systems operating outside of the visible light range, said apparatus including:

a motorized X-Y-Z motion apparatus comprising a movable support member for supporting a first optical element having an aperture for transmittal of light with a wavelength outside of the visible light spectrum, and motion-translating means for selectively moving that support member along mutually orthogonal X, Y and Z axes;

means for supporting a second optical element in the form of a source of a light beam having a wavelength outside of the visible range in a fixed position relative to the motorized motion apparatus with that light beam directed in the Z-axis direction at the first optical element;

a visible light vision system using visible light imaging for determining (a) the position of said first optical element relative to said visible light vision system in the X-Y plane and (b) the sharpness of an image of said first element detected by said visible light vision system, said vision system producing a first control signal representative of any misalignment of said first optical element relative to said vision system in X-Y plane and a second control signal representative of the sharpness of said image;

an optical measurement device responsive to said beam for measuring a power-related value of said beam and for producing a third control signal representative of the measured power-related value of said beam;

a motion control system for controlling operation of said motion-translating means, said motion control system being responsive to (a) said first control signal so as to cause said motion-translating means to move said movable support member in the X-axis and/or Y-axis direction as required to achieve X-axis and Y-axis alignment of said first optical element with said visible light vision system, (b) said second control system so as to cause said motion-translating means to move said movable support in the Z-axis direction as required to maximize the sharpness of said image, and (c) said third control signal so as to cause said motion-translating means to move said movable support member in the X-axis and Y-axis directions as required to maximize a power-related value of said beam.

16. An apparatus according to claim 15 further wherein said motion control system is programmed to respond to said first, second and third control signals in sequence, and further wherein it is programmed so as to cause said motion-translating means to move said movable support member a predetermined distance in Y-axis direction before responding to said third control signal, whereby to compensate for mechanical misalignment of the components of said apparatus and also optical aberration.

17. A method of achieving three-dimensional optical alignment of first and second optical elements wherein said first optical element has an aperture for passing light and said second optical element is adapted to provide a beam of light having a wavelength outside of the visible light range, said method comprising the following steps:

(a) providing a visible light vision system and an optical measurement device for measuring a value of the optical power of said beam, said vision system comprising an electronic camera, an objective, a source of visible light, means for directing said visible light through said objective, a dichroic mirror positioned between said objective and said camera at an angle to the optical axis to said vision system, said mirror being transparent to said visible light and functioning as reflector of light with a wavelength outside of the range of visible light, and said optical measurement system being responsive to light having a wavelength outside of the range of visible light and being positioned to intercept such non-visible light upon its reflection by said mirror;

(b) aligning said second optical element with respect to said visible light vision system so that said beam of light will be directed along the optical axis of said vision system for reflection by said mirror;

(c) positioning said first element so that its said aperture is substantially aligned with the optical axis of said vision system;

(d) operating said vision system so as to cause a visible light image of said first element to be captured by said camera;

(e) determining any misalignment of said image in the X-Y plane relative to the optical axis of said vision system;

(f) moving said first element along the X-axis and Y-axis so as substantially eliminate said misalignment in the X-Y plane;

(g) adjusting the position of said first optical element along the Z-axis until the sharpness of said image is at a maximum value;

(h) moving said first optical element in the Z-axis direction a predetermined amount calculated to compensate for optical aberrations related to transmittal of said beam through said objective;

(i) passing said beam of light to said optical measurement device via said objective and reflection from said mirror;

(j) using said optical measurement device to measure a power-related value of said beam;

(k) and moving said first element along the X-axis and Y-axis until said power related value of said beam as measured by said optical measurement device has reached a maximum level.

18. A method according to claim 17 wherein said second optical element provide a beam of infra-red light.

19. A method of achieving three-dimensional optical alignment of first and second optical elements wherein said first optical element has an aperture for passing light and said second optical element is adapted to provide a beam of light having a wavelength outside of the visible light range, said method comprising the following steps:

(a) fixing said second optical element in a predetermined position in relation to the Z-axis of a system consisting of orthogonal X, Y and Z axes;

(b) positioning said first optical element so that it is substantial centered on said Z-axis;

(c) using a visible light vision system to determine any misalignment of said first optical element along said X axis and said Y axis in relation to said second optical element, and moving said first optical element along said X and/or Y axes as required to eliminate said misalignment;

(d) using said visible light vision system to determine the sharpness of a visible light image of said first optical element captured by said visible light vision system, and moving said first optical element along said Z-axis as required to maximize the sharpness of said image;

(e) moving said first optical element along said Z-axis a predetermined distance to compensate for optical aberrations that occur when said beam is transmitted through said vision system; and (f) transmitting a beam from said second element through said first optical element and a portion of said vision system to an optical measurement device;

(g) using said optical instrument device to measure a power-related value of said beam; and (h) moving said first optical element along the X-axis and/or the Y-axis as required to maximize the power-related value measured by said optical measurement device.

20. A method according to claim 19 wherein said vision system comprises an electronic camera and said optical measurement device is an optical power meter or an optical spectrum analyzer.

21. A method according to claim 19 wherein said second optical element provides a beam of infra-red light.

* * * * *